United States Patent
Ito et al.

(10) Patent No.: US 7,415,332 B2
(45) Date of Patent: Aug. 19, 2008

(54) METHOD AND SYSTEM FOR VEHICLE COMPONENT MANAGEMENT, METHOD AND SYSTEM FOR VEHICLE COMPONENT MANAGEMENT DATA UPDATE, AND VEHICLE COMPONENT MANAGEMENT CENTER

(75) Inventors: Hiroaki Ito, Aichi-gun (JP); Ifushi Shimonomoto, Okazaki (JP); Toshio Shimomura, Chiryu (JP)

(73) Assignee: DENSO CORPORATION, Kariya (JP)

( * ) Notice: Subject to any disclaimer, the term of this patent is extended or adjusted under 35 U.S.C. 154(b) by 141 days.

(21) Appl. No.: 11/004,968

(22) Filed: Dec. 7, 2004

(65) Prior Publication Data
US 2005/0192716 A1  Sep. 1, 2005

(30) Foreign Application Priority Data
Jan. 8, 2004 (JP) ............................. 2004-003205

(51) Int. Cl.
*G01M 17/00* (2006.01)
*H04Q 5/22* (2006.01)
*B60L 1/00* (2006.01)

(52) U.S. Cl. ................ 701/29; 701/36; 340/426.11; 307/10.1

(58) Field of Classification Search ............. 701/1, 701/29, 31–36; 340/425.5, 426.11, 426.13, 340/426.14, 426.35; 307/9.1, 10.1, 10.4, 307/10, 10.5
See application file for complete search history.

(56) References Cited

U.S. PATENT DOCUMENTS

| | | | |
|---|---|---|---|
| 5,796,329 A * | 8/1998 | Bachhuber | 340/426.35 |
| 6,377,860 B1 * | 4/2002 | Gray et al. | 700/83 |
| 6,927,676 B2 * | 8/2005 | Edens et al. | 340/426.1 |

(Continued)

FOREIGN PATENT DOCUMENTS

JP   A-2002-321569   11/2002

(Continued)

OTHER PUBLICATIONS

Notice of Invitation to Submit Opinion from Korean Patent Office issued on Jul. 26, 2006 for the corresponding Korean patent application No. 10-2005-0001441 (a copy and English translation thereof).

(Continued)

*Primary Examiner*—Jack W. Keith
*Assistant Examiner*—Edward Pipala
(74) *Attorney, Agent, or Firm*—Posz Law Group, PLC

(57) ABSTRACT

Each of ECUs constituting a system of a vehicle is registered with authentication IDs of other ECUs. The each of ECUs determines whether the other ECUs are regular by comparing the registered IDs with authentication IDs newly obtained from the other ECUs when the system is started. When a certain ECU within the other ECUs is determined to be not regular, the certain ECU is prohibited from being used in this system. Further, when a new ECU is substituted or added, a terminal confirms whether the new ECU is unused in another vehicle and is thereby enabled to be usable by transmitting an authentication ID of the new ECU to a management center. When the new ECU is confirmed to be enabled to be usable, authentication IDs registered in the respective ECUs are updated.

8 Claims, 4 Drawing Sheets

U.S. PATENT DOCUMENTS

| | | |
|---|---|---|
| 7,016,986 B2 * | 3/2006 | Fasolt .............................. 710/8 |
| 7,120,507 B2 | 10/2006 | Tanaka |
| 7,131,005 B2 | 10/2006 | Levenson et al. |
| 2001/0002814 A1 * | 6/2001 | Suganuma et al. ......... 340/5.74 |
| 2001/0049569 A1 | 12/2001 | Gehrke |
| 2002/0038222 A1 | 3/2002 | Naka |
| 2002/0087240 A1 | 7/2002 | Raithel et al. |
| 2003/0080619 A1 * | 5/2003 | Bray et al. .................. 307/10.1 |
| 2003/0120395 A1 | 6/2003 | Kacel |
| 2004/0002799 A1 | 1/2004 | Dabbish et al. |
| 2004/0015272 A1 | 1/2004 | Vollmer et al. |
| 2004/0044454 A1 | 3/2004 | Ross et al. |
| 2005/0075759 A1 | 4/2005 | Furuta |
| 2005/0090941 A1 | 4/2005 | Stefan et al. |
| 2006/0036356 A1 | 2/2006 | Rasin et al. |
| 2006/0050103 A1 | 3/2006 | Naka |
| 2006/0235579 A1 | 10/2006 | Oesterling et al. |

FOREIGN PATENT DOCUMENTS

| | | |
|---|---|---|
| JP | A-2003-137071 | 5/2003 |
| JP | A-2003-324458 | 11/2003 |
| WO | WO 99/42344 | 8/1999 |

OTHER PUBLICATIONS

Office Action from U.S. Patent Office issued on Jan. 26, 2007 for the corresponding U.S. Appl. No. 11/516,503 (a copy thereof).

First Office Action issued from the Patent Office of the People's Republic of China for corresponding Chinese application No. 2005100003799.0 dated Mar. 9, 2007 (copy and translation enclosed).

Final Office Action issued from USPTO dated Jun. 25, 2007 in the corresponding US Divisional Patent Application No. 11/516,503.

* cited by examiner

REGISTRY ID UPDATE (VEHICLE)

METHOD AND SYSTEM FOR VEHICLE COMPONENT MANAGEMENT, METHOD AND SYSTEM FOR VEHICLE COMPONENT MANAGEMENT DATA UPDATE, AND VEHICLE COMPONENT MANAGEMENT CENTER

CROSS REFERENCE TO RELATED APPLICATIONS

This application is based on and incorporates herein by reference Japanese Patent Application No. 2004-3205 filed on Jan. 18, 2004.

FIELD OF THE INVENTION

The present invention relates to a method and system for vehicle component management, a method and system for vehicle component management data update, and a vehicle component management center.

BACKGROUND OF THE INVENTION

For instance, Patent Document 1 describes the following anti-theft system. A vehicle is equipped with an anti-theft device or an anti-theft component such as an immobilizer. For instance, the anti-theft device is for outputting an alarm by detecting a door opened and closed or the like by an unauthorized person. These anti-theft objects are periodically communicated with communications devices so that disassembling of these objects can be detected to thereby activate alarms. When the communications between the anti-theft objects and the communications devices becomes anomalous, it is determined that these anti-theft objects are stolen. The alarms are thereby outputted.

Patent Document 1: JP2003-137071 A

The vehicle equipped with the above systems can detect using the anti-theft device a door opened and closed by an unauthorized person to thereby notify it, or prevent using the anti-theft component an unauthorized person from starting an engine. Further, disassembling or destroying the anti-theft objects can be detected to then activate an alarm, so that theft of the vehicle or the in-vehicle devices can be properly prevented.

However, even in the above vehicle, when the communications device or a device for outputting the alarm by detecting anomaly in the communications is disassembled or destroyed, the alarm cannot be outputted. This cannot securely prevent the theft of the vehicle. In particular, a malicious thief tries to steal a vehicle and cannibalize its components for selling to obtain an illegal profit. The cannibalized components can be used in other vehicles, so that the above-described countermeasure cannot eradicate such a theft.

SUMMARY OF THE INVENTION

It is an object of the present invention to decrease thief's motivation to steal a vehicle or in-vehicle component, by disabling the thief from cannibalizing vehicle components for other vehicles. This additionally decreases an occurrence rate of vehicle theft.

To achieve the above object, a vehicle component management system is provided with the following. The vehicle component management system manages a plurality of components included in an in-vehicle system that is provided in a vehicle for achieving a certain function. A storing unit is included for storing, as component management data, unique identification codes that are assigned to the respective components included in the in-vehicle system. An identification code obtaining unit is included for obtaining, when the in-vehicle system is started, identification codes from components included in the in-vehicle system. A determining unit is included for determining whether the obtained identification codes accord with the identification codes stored as the component management data. A prohibiting unit is further included for prohibiting a certain component from being used, when the certain component is present. Here, the certain component has an identification code that does not accord with any one of the identification codes stored as the component management data.

In this structure, when an irregular component such as a stolen component is assembled in a vehicle, the irregular component cannot be used. Consequently, a thief cannot sell a component stolen from a vehicle, so that a vehicle theft occurrence rate can be decreased.

In another aspect of the present invention, a vehicle component management data update system is provided with the following. The vehicle component management data update system updates component management data of a certain vehicle by using a management center when a component in an in-vehicle system in the certain vehicle is substituted or added. Here, the certain vehicle includes the above-described component management system, while the management center is accessed to via a communications network. Further, here, the management center includes a vehicle database that is registered with, as vehicle data, identification codes of entire components included in the in-vehicle system with respect to each of vehicles that are shipped from an assembling factory. Further, the vehicle component management data update system includes an obtaining unit, an inquiring unit, and an updating unit. The obtaining unit obtains an identification code of a new component of a target for one of substitution and addition. The inquiring unit inquires whether the new component is enabled to be usable in the certain vehicle, by transmitting the obtained identification code to the management center via the communications network. The updating unit updates the component management data stored in a storing unit in the component management system based on the obtained identification code, when a response that the new component is enabled to be usable is received. The updating unit then causes the management center to update the vehicle data of the certain vehicle that is registered in the vehicle database.

In this structure, in a case where a new component in an in-vehicle system is substituted or added, only when the new component is unused in another vehicle, component management data can be updated. That is, when a stolen component is assembled as the new component, the component management data cannot be updated. This securely prevents use of a stolen component. Further, when a component is changed, a vehicle database in the management center can be also updated. This enables the management center to accurately manage components in the in-vehicle systems in the vehicles that are shipped from an assembling factory.

In another aspect of the present invention, a vehicle component management center is provided with the following. The vehicle component management center is used for updating component management data of a certain vehicle via the above-described management data update system, when a component in an in-vehicle system in the certain vehicle is substituted or added. Here, the certain vehicle includes the above-described component management system. Further, the vehicle component management center includes a vehicle database, a responding unit, and an updating unit. The vehicle database is registered with, as the vehicle data, identification codes of entire components included in the in-vehicle system with respect to each of vehicles that are shipped from an assembling factory. The responding unit transmits a respond as a determination result to the management data update system after determining using the vehicle database whether the new component is enabled to be usable in the certain vehicle when the identification code of the new component that is to be used in the certain vehicle is transmitted from the management data update system via the communications network. The updating unit then updates the vehicle data of the certain vehicle that is registered in the vehicle database, based on the identification code of the new component, when an update instruction is received from the management data update system via the communications network.

In this structure, when an identification code of a new component is transmitted from the component management data update system, it is determined whether the identification code is registered in the vehicle database. It is thereby determined whether the new component is assembled in another vehicle, so that a determination result is replied to the component management data update system. Further, when an update instruction for vehicle data is transmitted from the component management data update system, vehicle data of a relevant vehicle can be updated based on the identification code of the new component. The vehicle database can be thereby maintained at the latest state.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
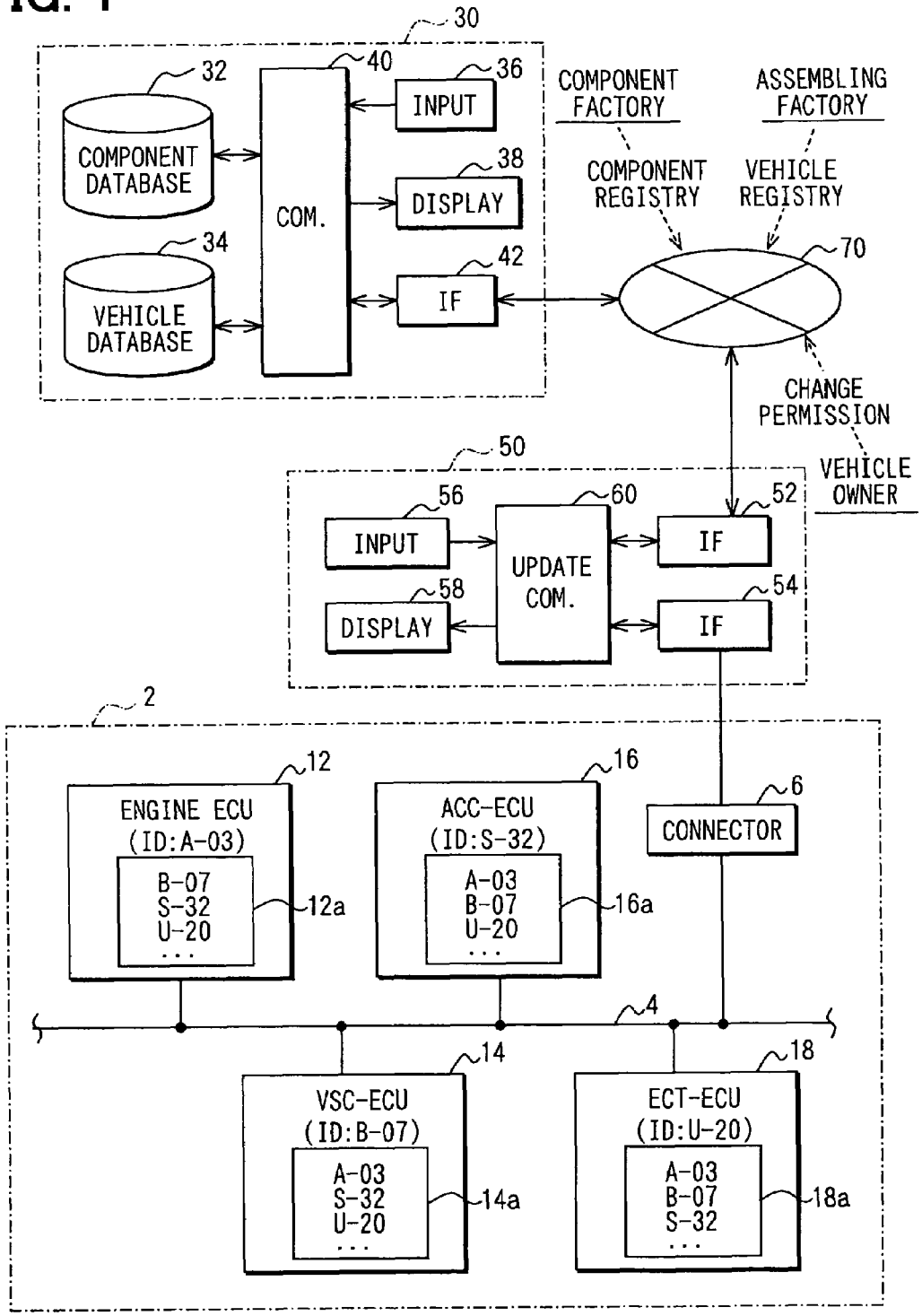
FIG. 1 is a block diagram showing peripheral devices for managing vehicles and their control system components according to an embodiment of the present invention.

FIG. 1 shows a vehicle 2 and its peripheral devices for managing components of a system of the vehicle 2, according to an embodiment of the present invention. As shown in FIG. 1, a control system of the vehicle 2 includes an engine ECU (Electronic Control Unit) 12 that controls an engine, a VSC-ECU 14 that controls a bearing and braking of the vehicle 2, an ACC-ECU 16 that causes the vehicle 2 to follow a preceding vehicle, and an ECT-ECU 18 that controls shifts of an automatic transmission. These components or ECUs 12 to 18 perform data communications with each other via a communications line 4 that forms an in-vehicle LAN.

Each of the ECUs 12 to 18 includes as a storing unit a data rewritable EEPROM 12a to 18a of non-volatile memory. Each of the EEPROMs 12a to 18a is registered with authentication IDs of other control system ECUs 12 to 18 as component management data via the communications line 4 when the vehicle 2 is assembled in an assembling factory.

For instance, the EEPROM 12a of the engine ECU 12 is registered with authentication IDs (B-07, S-32, U-20, etc.) of the VSC-ECU 14, the ACC-ECU 16, the ECT-ECU 18 and the like as the component management data. By contrast, the EEPROM 14a of the VSC-ECU 14 is registered with authentication IDs (A-03, S-32, U-20, etc.) of the engine-ECU 12, the ACC-ECU 16, the ECT-ECU 18 and the like as the component management data.

Figure 2:
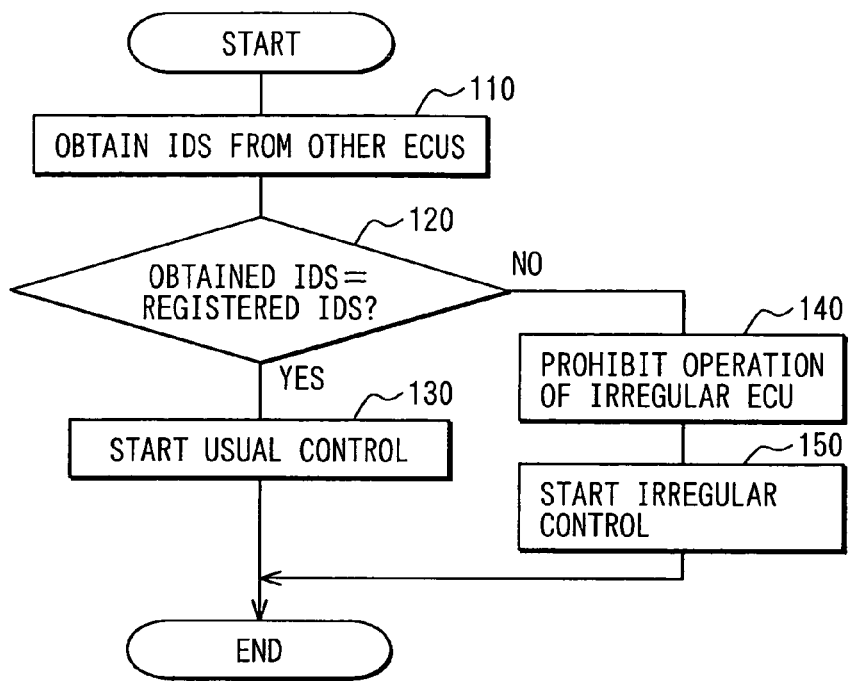
FIG. 2 is a flow chart showing an authentication process executed by each of in-vehicle ECUs at start-up.

Each of these ECUs 12 to 18 performs an authentication process at start-up (shown in FIG. 2) by using an internal micro-computer, for instance, when a key switch of the vehicle 2 is operated into an accessory position prior to an engine start.

In detail, in this start-up authentication process, at Step 110, authentication IDs are obtained from other ECUs 12 to 18 via the communications line 4. At Step 120, it is determined whether the entire obtained authentication IDs accord with authentication IDs registered as the component management data in the internal EEPROM. When it is determined that the entire obtained authentication IDs accord with the registered authentication IDs, it is determined that the entire ECUs 12 to 18 connected with the communications line 4 are regular (or authorized) components, then advancing the process to Step 130. Here, a usual control process is executed; then, the start-up authentication process is terminated.

By contrast, when it is determined that the entire obtained authentication IDs do not accord with any one of the registered authentication IDs, the process advances to Step 140. Here, an ECU that does not accord with the registered ID is designated as an irregular ECU, so that transmitting an instruction for stopping operation to this irregular ECU to thereby prohibit it from being operated. At subsequent Step 150, an irregular-control process is started that performs the control without communicating with the ECU designated as the irregular ECU; then, the start-up authentication process is terminated.

Thus, each of the ECUs 12 to 18 of the embodiment obtains authentication IDs of the other ECUs at the system start-up. When an authentication ID of a given ECU within the other ECUs is determined to be not according with any one of the authentication IDs registered as the component management data stored in an own internal EEPROM of the each of the ECUs 12 to 18, the given ECU is prohibited from being operated. An own control process is then executed without using the given ECU.

Consequently, when an irregular or stolen ECU that is even able to normally operate is assembled to the control system in the vehicle 2, the irregular ECU becomes unable to be used in this system. Adopting this control system of the embodiment to various vehicles disables a thief from selling an ECU stolen from a vehicle, which can decrease an occurrence rate of vehicle theft.

Further, each of the ECUs 12 to 18 transmits its authentication ID to a certain ECU when the certain ECU requires the authentication ID during the start-up authentication process or after start of the control process.

Next, the communications line 4 of the vehicle 2 can be connected with a terminal 50 as a component management data update system via a connector 6. The terminal 50 is used for the following case. That is, when, for enhancing functionality of the vehicle 2, any one of the ECUs 12 to 18 is substituted or a new ECU is added, it is confirmed that a substituted or added new ECU is not irregular component such as a stolen object, using an external vehicle component management center 30. Further, when the new ECU is not irregular component, the component management data (i.e., authentication IDs of other ECUs) registered in the respective EEPROMs 12a to 18a within the ECUs 12 to 18 including the new ECU are updated via the communications line 4.

To achieve this object, the terminal 50 includes: a center communications IF (interface) 52 performing a data communications with the management center 30 using a given public communications network 70 (e.g., public phone lines, the Internet); a vehicle communications IF 54 performing a data communications with the respective ECUs 12 to 18 of the vehicle 2; an input device 56 inputting data or various instructions by external operations; a display device 58 displaying various information; and an update computer 60 connected with various portions for updating the component management data.

Figure 3A:
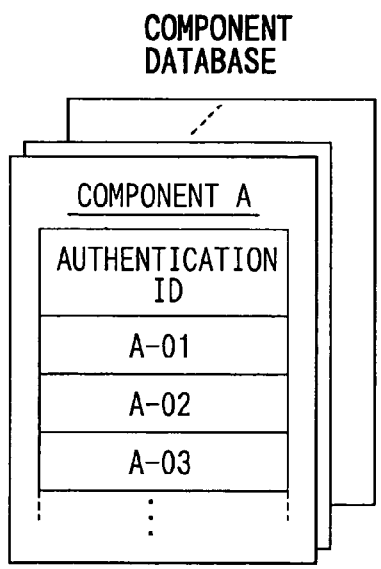
FIG. 3A is an explanatory diagram of a data structure of a component database provided in a management center.

By contrast, the management center 30 includes: a component database 32 that is registered with authentication IDs being authentication codes unique to the respective ECUs with respect to each of kinds of ECUs (A, B, . . . ) (shown in FIG. 3A) that are shipped from a component factory; a vehicle database 34 that is registered with authentication IDs of the entire control-system constituting ECUs with respect to each of vehicles shipped from the assembling factory; and a management computer 40 for managing the authentication IDs of the respective components and the vehicle data that are registered in the database 32, 34.

Further, the management center 30 includes: an input device 36 for inputting data or various instructions to the management computer 40; a display device 38 for displaying information outputted from the management computer 40; and a communications IF 42 that performs a data communications with other information devices including the terminal 50 via the public communications network 70.

When component data or vehicle data is received from data registry information devices disposed in an assembling factory or a component factory via the public communications network 70, the management computer 40 automatically registers the component database 32 or the vehicle database 34 with the received data.

Further, the vehicle database with respect to each of the vehicles registered in the vehicle database 34 includes a change-permission flag indicating whether a change relating to components or ECUs of the control system is permitted or not. Each vehicle owner can set or reset the change-permission flag by notifying the management center 30 of whether change of an ECU of an own vehicle is permitted or not by using a phone or the like.

Figure 3B:
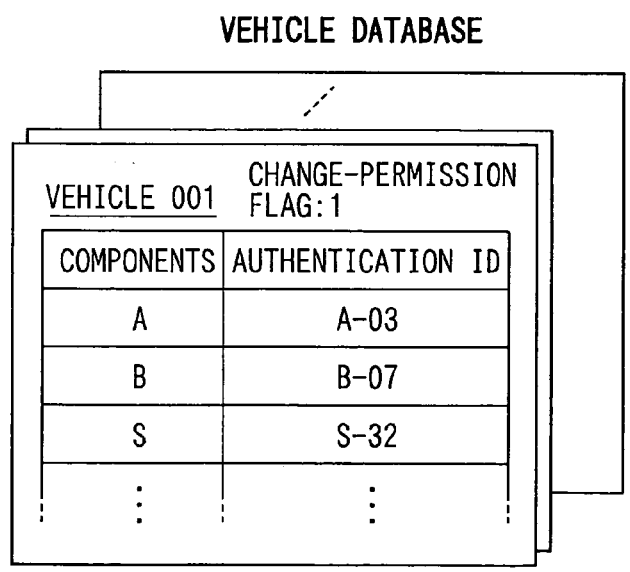
FIG. 3B is an explanatory diagram of a data structure of a vehicle database provided in a management center.

Here, the change-permission flag is used as permission information. An initial value is set to a reset state (0) for prohibiting change of a control system of each vehicle. When the owner notifies the management center 30 of a change permission for an ECU of the own vehicle, a change-permission flag of "VEHICLE 001" shown in FIG. 3B becomes a set state (1).

Next, the management computer 40 of the management center 30 performs an authentication process to determine whether a terminal 50 is regular or authorized when the terminal 50 accesses the management center 30 so as to update component management data registered in the EEPROM 12a to 18a of the ECUs 12 to 18 of the vehicle 2. After completing the authentication of the terminal 50, according to request from the terminal 50, the management computer 40 searches the component database 32 or the vehicle database 34 to reply a result or performs a vehicle data update process for updating the vehicle data of the vehicle 2 in the vehicle database 34.

The update computer 60 of the terminal 50 is connected with the communications line 4 via the connector 6. When an update instruction for the component management data is manually inputted via the input device 56 while the ECUs 12 to 18 of the vehicle 2 are being activated, the update computer 60 accesses the management center 30. After a communications line with the management center 30 is established, a registry data update process is performed to activate the vehicle data update process in the management center 30.

Hereinbelow, the registry data update process executed by the update computer 60 in the terminal 50, and the vehicle data update process executed by the management computer 40 in the management center 30 will be explained with reference to a flow chart in FIG. 4.

Figure 5:
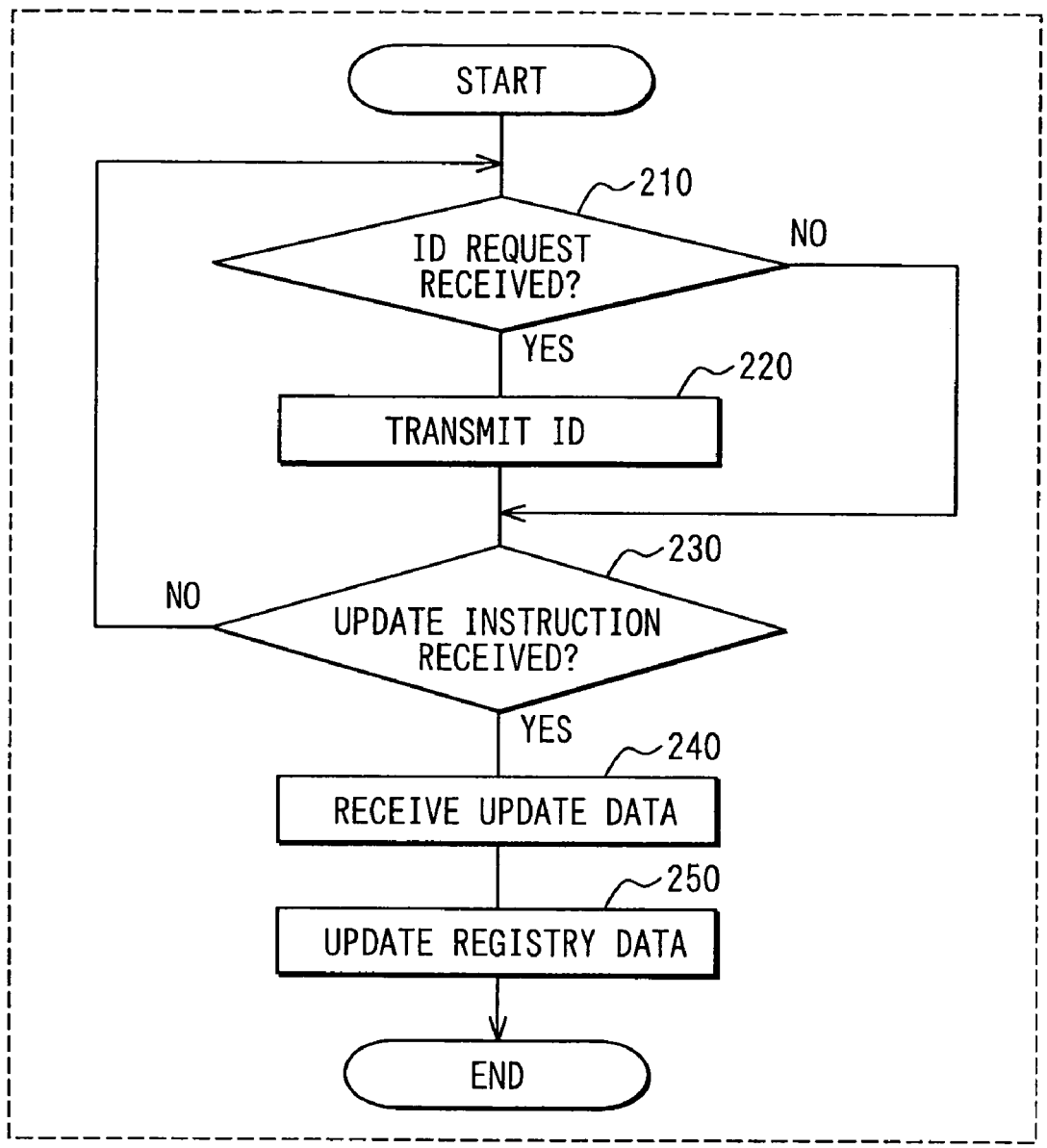
FIG. 5 is a flow chart showing an ID-code update process executed by each of in-vehicle ECUs.

When the control system is started up under a condition where the communications line 4 of the vehicle 2 is connected with the terminal 50 via the connector 6, the ECUs 12 to 18 perform given authentication processes, respectively. Here, it is determined whether the terminal 50 connected with the communications line 4 is usable or regular for updating the relevant control system. When the terminal 50 is determined to be usable for updating, a registry ID update process shown in FIG. 5 is executed.

Figure 4:
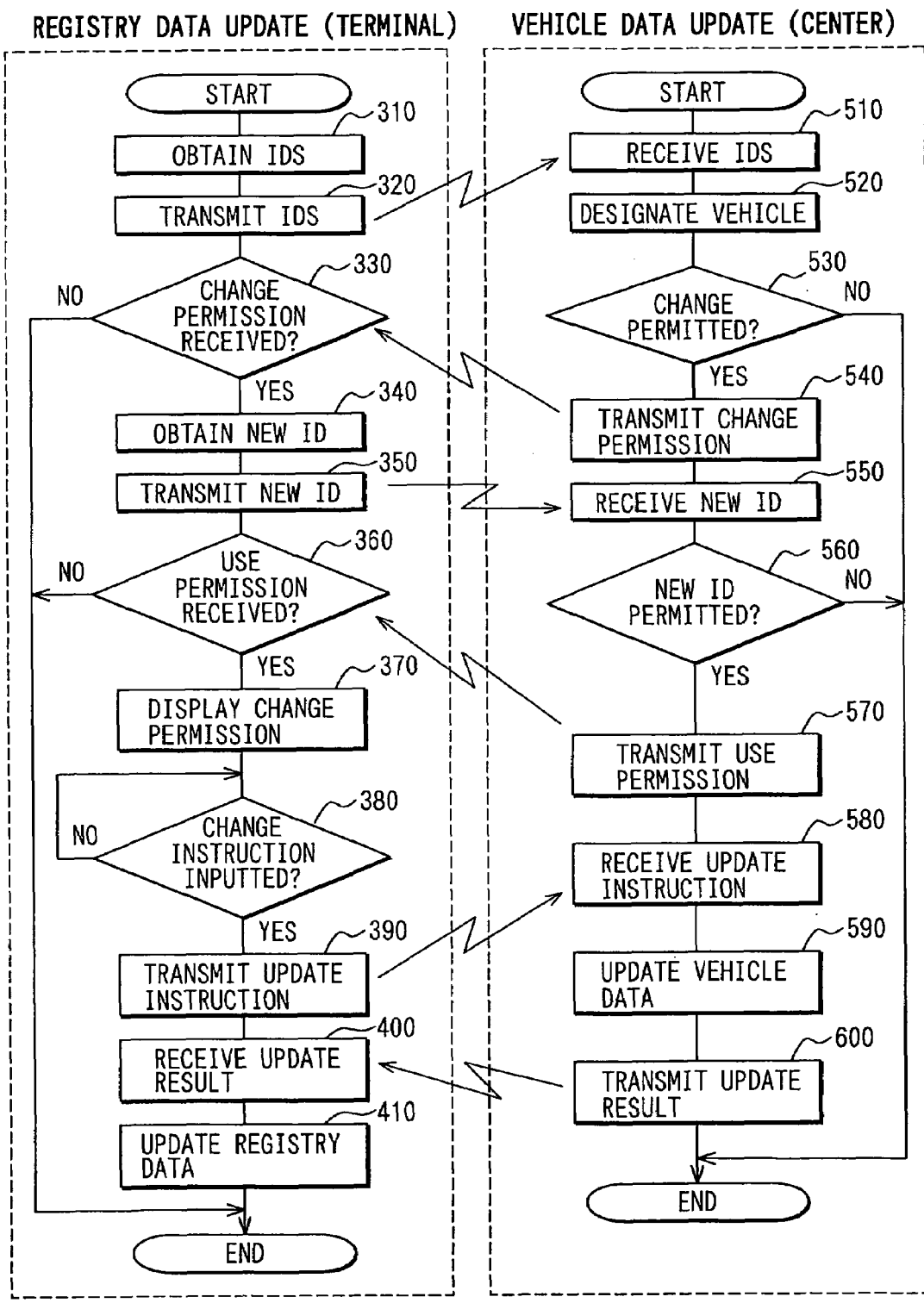
FIG. 4 is a flow chart showing a data update process executed by a terminal and a computer in a management center.

In this registry ID update process in the vehicle 2, each ECU 12 to 18 waits for a request signal for an authentication ID or a registry data update instruction, both of which are transmitted from the terminal 50 based on the registry data update process shown in FIG. 4. When the request signal for the authentication ID is received (Step 210: YES), an own authentication ID stored in the ROM is transmitted to the terminal 50 (Step S220). When the registry data update instruction request is received (Step 230: YES), the update data that is to be transmitted from the terminal 50 is then received (Step 240). Based on the received update data, the registry data (or component management data) in the own EEPROM is updated (Step 250).

As shown in FIG. 4, in the registry data update process executed by the update computer 60 in the terminal 50, at Step 310, the authentication IDs of the ECUs 12 to 18 are obtained by transmitting the request signal for the authentication IDs to the ECUs 12 to 18. At subsequent Step 320, the obtained authentication IDs are transmitted to the management center 30.

By contrast, after authenticating the terminal 50 to then start the vehicle data update process, the management computer 40 in the management center 30 performs a reception process that receives the entire authenticated IDs transmitted from the terminal 50. The process then proceeds to Step 520, where the corresponding vehicle is designated by searching the vehicle database 34.

At Step 530, whether the change of the control system is permitted is determined by determining whether the change-permission flag with respect to the vehicle data of the vehicle designated at Step 520 is set. When the change of the control system is not permitted, the vehicle data update process is terminated. By contrast, when the change of the control system is permitted, the process advances to Step 540, where the change permission is transmitted to the terminal 50.

Further, the update computer 60 in the terminal 50 determines whether the change permission is received from the management center 30 via the center communications IF 52 at Step 330, after a given period elapses from transmitting the authentication IDs to the management center 30. Here, the given period is more than a necessary period for the management center 30 to transmit the change permission.

When the change permission from the management center 30 is determined to be not received at Step 330, the control system of the vehicle 2 is prohibited from being changed by the vehicle owner. The registry data update process is thereby terminated. By contrast, when the change permission from the management center 30 is determined to be received at Step 330, the process advances to Step 340. Here, an authentication ID of a new ECU that is to be substituted or added in the control system of the vehicle 2 is obtained, so that the obtained ID is then transmitted to the management center 30 at Step 350.

Here, when the authentication ID of the new ECU is obtained, the display device 58 displays a message urging a user to input an authentication ID of the new ECU that is to be substituted or added. The authentication ID is obtained by reading the authentication ID inputted by the user using the input device 56.

Next, after the management computer 40 of the management center 30 transmits the change permission at Step 540, the process advances to S550, where a reception process is performed to receive the authentication ID of the new ECU transmitted from the terminal 50. When the authentication ID is received in this reception process, the process advances to Step 560.

At Step 560, it is determined that the new ECU is enabled to be usable in the vehicle 2 under a condition where the authentication ID of the new ECU is registered in the component database 32 and not registered in the vehicle database 34.

That is, when the authentication ID of the new ECU is not registered in the component database 32, the new ECU is assumed to be not regular component that is shipped from the component factory. When the authentication ID of the new ECU is registered in the vehicle database 34, the new ECU is assumed to be stolen from a certain vehicle or to be duplicated from that of the certain vehicle. Therefore, at Step 560, under the condition where the authentication ID of the new ECU is registered in the component database 32 and not registered in the vehicle database 34, the new ECU is determined to be enabled to be usable in the vehicle 2.

At Step 560, when the new ECU is determined to be not enabled to be usable in the vehicle 2, the vehicle data update process is terminated without any further process. Otherwise, when the new ECU is determined to be enabled to be usable in the vehicle 2, the process advances to Step 570, where a use permission of the new ECU is transmitted to the terminal 50.

Therefore, the update computer 60 in the terminal 50 determines whether a user permission from the management center 30 is received by the center IF 52 at Step 360 after a given period elapsed from when the authentication ID of the new ECU is transmitted to the management center 30.

When a user permission from the management center 30 is determined to be not received at Step 360, it is determined that the new ECU cannot be use in the vehicle 2. The vehicle data update process is thereby terminated without any further process. Otherwise, when a user permission from the management center 30 is determined to be received at Step 360, the process advances to Step 370. In this step, the display device 58 displays that the change of the new ECU is permitted, so that the user is urged to substitute or add the new ECU.

Here, after the display device 58 displays that the change of the new ECU is permitted, the user once stops the control system in the vehicle 2 to substitute or add the new ECU. The user then re-starts the control system to then input a change instruction via the input device 56. At subsequent Step 380, it is determined whether the change instruction is inputted via the input device 56. That is, an input of the change instruction is awaited. When the change instruction is determined to be inputted, the process advances to Step 390, where an update instruction for the vehicle data is transmitted to the management center 30.

The management computer 40 of the management center 30 executes at Step 580 a reception process that receives the update instruction transmitted from the terminal 50 after transmitting the use permission at Step 570. As the update instruction is received in this reception process, the process advances to Step 590.

At this Step 590, the vehicle data of the vehicle designated at Step 520 is updated based on the authentication ID of the new ECU received at Step 550. At subsequent Step 600, an update result of the vehicle data is transmitted to the terminal 50, so that the vehicle data update process is terminated.

Here, at this Step 590, when the vehicle data is updated, an ECU kind of the new ECU is initially recognized form the authentication ID of the new ECU. When the same kind ECU as the new ECU is present within the ECUs mounted so far in the vehicle, a substitution of ECU is determined. The vehicle data is thereby rewritten using the authentication ID of the new ECU. By contrast, when the same kind ECU is not present within the ECUs mounted so far, an addition of a new ECU kind is determined. The authentication ID of the new ECU is thereby added to the vehicle data.

The update computer 60 of the terminal 50 executes, at Step 400, a reception process that receives the update result transmitted from the management center 30 after transmitting the update instruction to the management center 30 at Step 390. As the update result is received in this reception process, the process advances to Step 410.

At this Step 410, registry data update instructions and update data are successively transmitted to the ECUs mounted in the vehicle, based on the received update result. The registry data (i.e., component management data) registered in the EEPROMs of the respective ECUs are updated, so that the registry data update process is terminated.

As explained above, in this embodiment, at start-up of a control system of a vehicle 2, respective ECUs 12 to 18 determine whether other ECUs are regular or not. When a given ECU within the other ECUs is determined to be not regular, the given ECU is prohibited from being used and, further, the following process takes place. That is, when an ECU constituting the control system of the vehicle 2 is replaced or a new ECU is added, component management data registered in the respective EEPROMs of the ECUs are updated so that the respective ECUs constituting the changed control system can authenticate the other ECUs by using a dedicated terminal that is provided as a body separated from the vehicle 2.

Further, when the terminal 50 updates the registry data (component management data), the terminal 50 confirms, using the management center 30, that an owner of the vehicle 2 permits a change of the control system and a new ECU substituted or added is not irregularly obtained. After this confirmation, the registry data in respective EEPROMs of the ECUs are updated.

Accordingly, this embodiment securely prevents an ECU stolen from another vehicle from being assembled and used in the vehicle 2, resulting in decrease in a vehicle theft occurrence rate.

Modification

For instance, in the above embodiment, multiple ECUs constituting a control system of a vehicle authenticate each other, so that an irregular component such as a stolen ECU is prevented from being used. However, the present invention can be directed to any in-vehicle system that includes multiple components without any limitation.

In the above embodiment, respective ECUs constituting a control system of a vehicle authenticate other ECUs. However, a specific ECU such as an engine ECU can authenticate other ECUs. Otherwise, a gateway that connects networks for an in-vehicle control system and an in-vehicle body system can supervise each of the components connected with the networks.

It will be obvious to those skilled in the art that various changes may be made in the above-described embodiments of the present invention. However, the scope of the present invention should be determined by the following claims.

What is claimed is:

1. A vehicle component management data update method for updating component management data of a certain vehicle by using a management center when a component in an in-vehicle system in the certain vehicle is substituted or added,
    wherein the certain vehicle includes a component management system including:
       a storing unit that stores, as the component management data, identification codes that are assigned to a plurality of respective components included in the in-vehicle system in the certain vehicle;
       an identification code obtaining unit that obtains, when the in-vehicle system is started, identification codes from the plurality of components included in the in-vehicle system in the certain vehicle;
       a determining unit that determines whether the obtained identification codes accord with the identification codes stored as the component management data; and
       a prohibiting unit that prohibits, when a certain component whose identification code does not accord with any one of the identification codes stored as the component management data is present, the certain component from being used,
    wherein the management center is located outside of the certain vehicle, is accessed via a communications network, and includes:
       a vehicle database that is registered with, as vehicle data, identification codes of the entire plurality of components included in the in-vehicle system with respect to each of plural vehicles including the certain vehicle, that are shipped from an assembling factory; and
       a management computer configured to manage the identification codes and the vehicle data registered in the vehicle database,
    the method comprising steps of:
       obtaining an identification code of a new component of a target for one of substitution and addition;
       transmitting the obtained identification code to the management center via the communications network to thereby inquire whether the new component is enabled to be usable in the certain vehicle;
       updating, when a response that the new component is enabled to be usable is received, the component management data stored in the storing unit of each of the components based on the obtained identification code; and
       causing the management center to update the vehicle data of the certain vehicle that is registered in the vehicle database.

2. The vehicle component management data update method of claim 1,
    wherein the vehicle database includes permission information representing whether a change of the in-vehicle system is permitted with respect to each of the vehicles,
    wherein, when the new component in the in-vehicle system in the certain vehicle is substituted or added, whether the change of the in-vehicle system is permitted or not in the certain vehicle is queried in addition to whether the new component is enabled to be usable in the certain vehicle, and
    wherein, when a response that the new component is enabled to be usable in the certain vehicle and that the change of the in-vehicle system is permitted in the certain vehicle is received, the component management data stored in the storing unit is updated based on the identification code of the new component, and the management center is caused to update the vehicle data of the certain vehicle that is registered in the vehicle database.

3. The vehicle component management data update method of claim 1, wherein:
    the management center further includes, in addition to the vehicle database, a component database that is registered with identification codes shipped from a component factory;
    when the management center is queried whether the new component is enabled to be usable in the certain vehicle by receiving the obtained identification code, the management center performs a determination as to whether or not the new component is enabled to be usable in the certain vehicle by referring to the vehicle database and the component database based on the received obtained identification code; and
    when the determination is affirmed, the response that the new component is enabled to be usable is transmitted by the management center to the certain vehicle.

4. The vehicle component management data update method of claim 3, wherein
    when the received obtained identification code is registered in the component database and not registered in the vehicle database, the determination is affirmed in the management center.

5. The vehicle component management data update method of claim 1, wherein identification codes assigned to respective components of the certain vehicle can be different from each other.

6. The vehicle component management data update method of claim 1,
    wherein the storing unit and the identification code obtaining unit are provided for each of the components,
    wherein, when the in-vehicle system is started, each of the identification code obtaining units obtains identification codes from each of the other components included in the in-vehicle system,
    wherein the determining unit determines whether the obtained identification codes accord with identification codes that are stored as the component management data and correspond to each of the other components included in the in-vehicle system,
    wherein each updating of the component management data with regard to the new component updates the component management data stored in the storing unit of each of the components with the obtained identification code.

7. A computer-readable medium comprising instructions being executed by a computer, the instructions including a vehicle component management data update method for updating component management data of a certain vehicle by using a management center when a component in an in-vehicle system in the certain vehicle is substituted or added,
    wherein the certain vehicle includes a component management system including:
       a storing unit that stores, as the component management data, unique identification codes that are assigned to a plurality of respective components included in the in-vehicle system in the certain vehicle;

an identification code obtaining unit that obtains, when the in-vehicle system is started, identification codes from the plurality of components included in the in-vehicle system in the certain vehicle;

a determining unit that determines whether the obtained identification codes accord with the identification codes stored as the component management data; and a prohibiting unit that prohibits, when a certain component whose identification code does not accord with any one of the identification codes stored as the component management data is present, the certain component from being used, wherein the storing unit and the identification code obtaining unit are provided for each of the components and the storing unit has identification codes for each of the plurality of respective components, wherein the determining unit determines whether the obtained identification codes accord with identification codes that are stored as the component management data and correspond to other components included in the in-vehicle system, wherein the management center is located outside of the certain vehicle, is accessed via a communications network, and includes:

a vehicle database that is registered with, as vehicle data, identification codes of the entire plurality of components included in the in-vehicle system with respect to each of plural vehicles including the certain vehicle, that are shipped from an assembling factory, the instructions for implementing the steps of:

obtaining an identification code of a new component of a target for one of substitution and addition;

transmitting the obtained identification code to the management center via the communications network to thereby inquire whether the new component is enabled to be usable in the certain vehicle;

updating, when a response that the new component is enabled to be usable is received, the component management data stored in the storing unit of each of the components with the obtained identification code; and causing, when the response that the new component is enabled to be usable is received, the management center to update the vehicle data of the certain vehicle that is registered in the vehicle database with the obtained identification code.

8. A vehicle component management method for managing components of each of a plurality of vehicles by using a management center located outside of the certain vehicle via a terminal connectable with an in-vehicle system in the each of the vehicles, the method comprising:

storing in a certain vehicle, as component management data of the certain vehicle, identification codes that are assigned to a plurality of components included in an in-vehicle system of the certain vehicle when the certain vehicle is shipped from an assembling factory;

obtaining, when the in-vehicle system is started, identification codes from the plurality of components included in the in-vehicle system;

prohibiting a certain component from being used, the certain component having an identification code that does not accord with any one of the identification codes stored as the component management data of the certain vehicle;

registering in a vehicle database of the management center, as vehicle data, identification codes of entire plurality of components, which are included in an in-vehicle system of each of the plurality of vehicles including the certain vehicle and assigned when the each of the plurality of vehicles is shipped from the assembling factory;

obtaining, using the terminal, an identification code of a new component as a target for one of substitution and addition for the in-vehicle system of the certain vehicle;

transmitting, using the terminal, the obtained identification code to the management center via a communications network to thereby inquire whether the new component is enabled to be usable in the in-vehicle system of the certain vehicle;

updating, using the terminal, when a response that the new component is enabled to be usable is received from the management center, the component management data stored in the in-vehicle system of the certain vehicle based on the obtained identification code; and updating, with respect to the certain vehicle, the vehicle data registered in the vehicle database of the management center.

* * * * *